(12) United States Patent
Schwefer et al.

(10) Patent No.: US 7,393,512 B2
(45) Date of Patent: Jul. 1, 2008

(54) DENITRIFICATION METHOD

(75) Inventors: Meinhard Schwefer, Meschede (DE); Michael Groves, Gevelsberg (DE)

(73) Assignee: Uhde GmbH (DE)

( * ) Notice: Subject to any disclaimer, the term of this patent is extended or adjusted under 35 U.S.C. 154(b) by 349 days.

(21) Appl. No.: 10/510,490

(22) PCT Filed: Mar. 21, 2003

(86) PCT No.: PCT/EP03/02958

§ 371 (c)(1), (2), (4) Date: Apr. 25, 2005

(87) PCT Pub. No.: WO03/084646

PCT Pub. Date: Oct. 16, 2003

(65) Prior Publication Data

US 2005/0244320 A1 Nov. 3, 2005

(30) Foreign Application Priority Data

Apr. 9, 2002 (DE) .............................. 102 15 605

(51) Int. Cl.
*B01D 53/56* (2006.01)
(52) U.S. Cl. ................. 423/239.1; 423/239.2
(58) Field of Classification Search .............. 423/239.1, 423/239.2
See application file for complete search history.

(56) References Cited

U.S. PATENT DOCUMENTS 5,482,692 A * 1/1996 Audeh et al. ............. 423/239.2
6,056,928 A * 5/2000 Fetzer et al. ................ 423/235

2004/0109805 A1 6/2004 Schwefer et al.

FOREIGN PATENT DOCUMENTS

| EP | 0 393 917 | | 10/1990 |
|---|---|---|---|
| EP | 0 756 891 A1 | * | 2/1997 |
| JP | 09/000884 | | 1/1997 |
| WO | WO-99/49954 | | 10/1999 |
| WO | WO 01/51182 A1 | | 7/2001 |
| WO | WO-02/087733 | | 11/2002 |

OTHER PUBLICATIONS

Derwent Abstract of AN-1997-113390. XP-002242664 & JP9000884 A (Babcock-Hitachi KK) (Jan. 7, 1997).
Kogel, M. et al., "Simultaneous Catalytic Removal of NO and N2O using Fe-MFI", Journal of Catalysis 182:470-478, XP-000996158 (1999).
Kameoka, S. et al, "Selective catalytic reduction of N2O with methane in the presence of excess oxygen over Fe-BEA zeolite" Chem. Commun.: 745-746 (2000).

* cited by examiner

*Primary Examiner*—Timothy C Vanoy
(74) *Attorney, Agent, or Firm*—Connolly Bove Lodge & Hutz LLP

(57) ABSTRACT

A process for reducing the content of $NO_x$ and $N_2O$ in gases, in particular in process gases and offgases, which comprises the measures: a) addition of at least one nitrogen-containing reducing agent to the $NO_x$- and $N_2O$-containing gas in at least the amount required for complete reduction of the $NO_x$; b) addition of a hydrocarbon, of carbon monoxide, of hydrogen, or of a mixture of one or more of these gases to the $NO_x$- and $N_2O$-containing gas for the reduction of the $N_2O$; and c) introduction of the gas mixture into at least one reaction zone at temperatures of up to 450° C., which contains one or more iron-laden zeolites. The process can be used, in particular, in nitric acid production, for offgases from power stations or for gas turbines.

9 Claims, No Drawings

DENITRIFICATION METHOD

The invention relates to a process for reducing the content of nitrogen oxides in offgases or process gases.

In many processes, e.g. combustion processes or the industrial preparation of nitric acid, an offgas laden with nitrogen monoxide NO, nitrogen dioxide $NO_2$ (together referred to as $NO_x$) and also nitrous oxide $N_2O$ is formed. While NO and $NO_2$ have long been known as compounds having ecotoxically relevance (acid rain, smog formation) and are subjected worldwide to limits for their maximum permissible emissions, nitrous oxide has in recent years also increasingly moved into the focus of environmental protection, since it contributes to a not inconsiderable extent to the degradation of stratospheric ozone and to the greenhouse effect. There is thus, for reasons of environmental protection, an urgent need for technical solutions which enable nitrous oxide emissions to be eliminated together with the NOx emissions.

There are numerous possible ways of removing $N_2O$ and $NO_x$ separately, and these can be combined in an appropriate way in two-stage processes.

It is known from EP-A-393,917 that nitrogen oxides can be removed from gases by means of ammonia and selected zeolite catalysts. However, this document describes only the reduction of $NO_x$ by means of ammonia. Zeolites proposed are the types USY, beta and ZSM-20, which have large pores and a specific silicon dioxide:aluminum oxide ratio.

It is known from Chem. Commun. 2000, 745-6 that $N_2O$ can be selectively reduced catalytically by means of methane in the presence of excess oxygen and the presence of an iron-laden zeolite of the beta type (BEA).

JP-A-09/000,884 discloses a process for reducing the content of $N_2O$ and NO, in which ammonia, alcohols and/or hydrocarbons are used as reducing agent and zeolites of the pentasil or mordenite type are used as catalyst.

Starting out from this prior art, the present invention provides a simple but extremely economical process which gives excellent conversions both for the removal of $NO_x$ and for the removal of $N_2O$ at low operating temperatures.

It has surprisingly been found that in the reduction of $N_2O$ from $NO_x$-containing gases, the $NO_x$ has an inhibiting effect on the removal of $N_2O$ and that improved reduction of $N_2O$ occurs when the $NO_x$ is completely reduced.

The invention provides a process for reducing the content of $NO_x$ and $N_2O$ in gases, in particular in process gases and offgases, which comprises the measures:

a) addition of at least one nitrogen-containing reducing agent, in particular ammonia, to the $NO_x$- and $N_2O$-containing gas in at least the amount required for complete reduction of the $NO_x$, b) addition of a hydrocarbon, of carbon monoxide, of hydrogen or of a mixture of a plurality of these gases to the $NO_x$- and $N_2O$-containing gas for the reduction of the $N_2O$ and c) introduction of the gas mixture into at least one reaction zone at temperatures of up to 450° C. which contains one or more iron-laden zeolites, preferably iron-laden zeolites containing channels made up of twelve-membered rings, in particular iron-laden zeolites all of whose channels are made up of twelve-membered rings, very particularly preferably iron-laden zeolites of the BEA or FAU type.

To carry out the process of the invention, the $N_2O$- and $NO_x$-containing gas is firstly mixed with a nitrogen-containing reducing agent and hydrocarbons or carbon monoxide and/or hydrogen and subsequently passed over the iron-laden zeolite(s) at a temperature of less than 450° C. to remove $N_2O$ and $NO_x$, in each case by reduction.

According to feature a) of the process of the invention, the nitrogen-containing reducing agent is added in at least the amount required for complete reduction of the $NO_x$. For the purposes of the present description, the amount of nitrogen-containing reducing agent required for complete reduction of the $NO_x$ is that amount of nitrogen-containing reducing agent which is necessary to reduce the proportion of $NO_x$ in the gas mixture to a residual content of less than 10 ppm, preferably less than 5 ppm and in particular less than 1 ppm.

As nitrogen-containing reducing agents, it is possible to employ any compounds which are capable of reducing $NO_x$. Examples of such reducing agents are hydrogen compounds of nitrogen, e.g. azanes, hydroxyl derivatives of azanes and also amines, oximes, carbamates, urea or urea derivatives.

Examples of azanes are hydrazine and in particular ammonia.

An example of a hydroxyl derivative of azanes is hydroxylamine.

Examples of amines are primary aliphatic amines such as methylamine.

An example of a carbamate is ammonium carbamate.

Examples of urea derivatives are N,N'-substituted ureas such as N,N'-dimethyl urea. Ureas and urea derivatives are preferably used in the form of aqueous solutions.

According to feature b) of the process of the invention, the hydrocarbon, the carbon monoxide and/or the hydrogen are added to reduce the $N_2O$. These reducing agents are added in the amount required for the reduction of the $N_2O$. For the purposes of the present description, this means that amount of reducing agent which is necessary to reduce the $N_2O$ in the gas mixture either completely or to a desired final concentration.

In general, the temperature in the reaction zone is from 200 to 450° C., preferably from 250 to 450° C.

The reduction of the content of $NO_x$ and $N_2O$ is preferably effected in the presence of a single catalyst which consists essentially of one or more iron-laden zeolites.

When more than one and different zeolite catalysts are used, these can be mixed with one another or arranged in series. The latter arrangement is particularly advantageous when the zeolite closest to the inlet catalyzes especially the $NO_x$ reduction by means of a nitrogen-containing reducing agent and/or the zeolite closest to the outlet catalyzes especially the $N_2O$ reduction.

In this way, the $NO_x$ content in the first zeolite zone can be reduced particularly quickly and completely, so that the subsequent zeolite can fully fulfill its function of reducing the $N_2O$, since the $NO_x$ which has an adverse effect on the $N_2O$ reduction has been completely removed before entry into the second zone.

Reducing agents used for the purposes of the invention for the $NO_x$ are nitrogen-containing reducing agents, in particular ammonia, and those used for the $N_2O$ are hydrocarbons, hydrogen, carbon monoxide or mixtures thereof, e.g. synthesis gas.

The amount of reducing agent added to reduce the $N_2O$ depends essentially on the desired degree of removal of the $N_2O$ and on the type of reducing agent used. When hydrocarbons such as methane or propane are used, the required amount is about 0.2-1 mol of hydrocarbon/1 mol of $N_2O$ to be reduced. Preference is given to amounts of 0.2-0.7 mol of hydrocarbon/1 mol of $N_2O$ to be reduced, in particular 0.2-0.5 mol of hydrocarbon/1 mol of $N_2O$ to be reduced.

This amount is very small compared with other values reported in the literature (cf., for example, FIG. 4 in JP-A-90/

00,884). The fact that a high degree of removal of $N_2O$ is nevertheless achieved can be explained by the complete reduction of $NO_x$, as provided for according to the invention. This is a great advantage of the process of the invention since, in particular at high degrees of removal of $N_2O$, the economics of the process are sensitive to the costs of the reducing agent added.

Of course, what has been said regarding the amounts of the reducing agents used applies only to the case where the reduction of the nitrogen oxides to be removed is subject to no other constraints, for example kinetic constraints. Such constraints are known to those skilled in the art. Thus, a given redox reaction always requires a certain minimum temperature and minimum residence time in the reactor bed. Thus, the reduction of $NO_x$ by means of $NH_3$ proceeds so quickly that the kinetic constraints of the reaction have been overcome even for high space velocities (>50 000 $h^{-1}$) at temperatures as low as 200° C., while the reduction of $N_2O$, e.g. using methane, proceeds to completion only at significantly higher temperatures (>300° C.) and lower space velocities (about 10 000 $h^{-1}$).

However, there is also an upper limit to the temperature in the process of the invention. Thus excessively high temperatures (>450° C.) effect a partial oxidation of the reducing agent added by means of oxygen present in the offgas, so that this is no longer available for reducing the $NO_x$ and $N_2O$. This applies particularly to the nitrogen-containing reducing agent added. The reduction of $NO_x$ is then no longer complete, which results in the $N_2O$ reduction also being inhibited.

Particularly preferred reducing agents for $N_2O$ are saturated hydrocarbons or mixtures thereof, e.g. methane, ethane, propane, butane, synthesis gas or LPG.

Very particular preference is given to methane. This is used, in particular, in combination with an iron-laden zeolite of the BEA type.

The amount of nitrogen-containing reducing agent added has to be selected so as to be sufficient for complete reduction of the $NO_x$. In the case of ammonia, the stoichiometrically required amount for complete removal of the $NO_x$ is 1.33 (8/6) mol of ammonia per one mol of $NO_x$. It has been found that when the pressure increases or the reaction temperatures decrease, the amount of ammonia required for complete removal of the $NO_x$ drops from the abovementioned 1.33 mol to 0.9 mol. A smaller proportion of ammonia may also be consumed in the $N_2O$ reduction, so that sometimes a correspondingly larger amount of ammonia has to be used for the complete reduction of $NO_x$, for example up to 1.5 mol of ammonia per one mol of $NO_x$.

Catalysts used are the above-defined iron-laden zeolites or mixtures of iron-laden zeolites.

It has surprisingly been found that a very efficient reduction of $N_2O$ can be carried out by means of such catalysts when the $NO_x$ has been reduced completely.

Under the process conditions described here, the nitrogen-containing reducing agent acts mainly as a reducing agent for $NO_x$ and the hydrocarbons, carbon monoxide and/or hydrogen act selectively to reduce the $N_2O$ present in the gas.

The configuration of the reaction zone can be chosen freely for the purposes of the invention. It can, for example, be located in a tube reactor or radial basket reactor. The way in which the gaseous reducing agents are introduced into the gas stream to be treated can also be chosen freely for the purposes of the invention, as long as this is in the flow direction upstream of the reaction zone. It can be effected, for example, in the inward line upstream of the container for the catalyst bed or just before the bed. The reducing agents can be introduced in the form of gases or in the form of a liquid or aqueous solution which vaporizes in the gas stream to be treated.

The order of addition of the reducing agents for $NO_x$ and for $N_2O$ can be chosen freely. Thus, the order of the steps a) and b) can be exchanged or both types of reducing agent can be introduced in one step.

The catalysts used for the purposes of the invention are known to those skilled in the art and can contain additives known per se, e.g. binders.

A catalyst or a catalyst component for the oxidation of any unreacted or partially oxidized material from the group consisting of one or more hydrocarbons, preferably $CH_4$ or $C_3H_8$, and also CO and $H_2$ can be integrated into the catalyst or located downstream thereof or connected to it in another way.

Catalysts used according to the invention are preferably based on zeolites into which iron has been introduced by means of solid-state ion exchange. For this purpose, it is usual to start out from commercially available ammonium zeolites and the appropriate iron salts (e.g. $FeSO_4 \times 7\ H_2O$) and mix these intensively with one another by mechanical means in a ball mill at room temperature. (Turek et al.; Appl. Catal. 184, (1999) 249-256; EP-A-0 955 080). These publications are hereby expressly incorporated by reference. The catalyst powders obtained are subsequently calcined in air at temperatures in the range from 400 to 600° C. in a muffle furnace. After calcination, the iron-containing zeolites are intensively washed in distilled water and filtered off and dried. The iron-containing zeolites obtained in this way are finally treated with the appropriate binders and mixed and, for example, extruded to form cylindrical catalysts bodies. Suitable binders are all binders customarily used; the most frequently used of these are aluminum silicates such as kaolin.

According to the present invention, the zeolites which can be used are laden with iron. The iron content based on the mass of zeolite can be up to 25%, but is preferably from 0.1 to 10% (iron calculated as $Fe_2O_3$)

Precise details on the make-up or structure of these zeolites are given in the Atlas of Zeolite Structure Types, Elsevier, $4^{th}$ revised Edition 1996, which is hereby expressly incorporated by reference.

Zeolites which are particularly preferred according to the invention are of the FAU type and in particular of the BEA type.

The gas laden with nitrogen oxides is usually passed over the catalyst at a space velocity of from 200 to 200 000 $h^{-1}$, preferably from 5000 to 100 000 $h^{-1}$, based on the catalyst volume.

Here, the space velocity is the volume of gas mixture per hour divided by the volume of catalyst. The space velocity can thus be adjusted via the flow rate of the gas and/or via the amount of catalyst.

The process of the invention is generally carried out at a pressure in the range from 1 to 50 bar, preferably from 1 to 25 bar, with a higher operating pressure reducing the consumption of reducing agents, by-product formation and the leakage.

The introduction of the reducing agent into the gas to be treated is effected by means of a suitable apparatus, e.g. an appropriate pressure valve or appropriately configured nozzles.

The water content of the reaction gas is preferably in the range of <25% by volume, in particular in the range <15% by volume.

In general, a relatively low water concentration is preferred, since higher water contents would make higher operating temperatures necessary. This could, depending on the zeolite type used and the period of operation, exceed the hydrothermal stability limits of the catalyst and thus has to be matched to the individual case chosen.

The presence of $CO_2$ and of other deactivating constituents of the reaction gas known to those skilled in the art should also be minimized where possible, since these would have adverse effects on the removal of $N_2O$ and $NO_x$.

The process of the invention also operates in the presence of $O_2$, since the catalysts used according to the invention have appropriate selectivities which at temperatures of <450° C. suppress reaction of the gaseous reducing agent, e.g. $NH_3$, with $O_2$.

All these influencing factors and also the chosen space velocity over the catalyst have to be taken into account in choosing the appropriate operating temperature of the reaction zone.

The conversions of $N_2O$ and $NO_x$ which can be achieved using the present process at low operating temperatures are virtually 100% for $NO_x$ and preferably >70%, in particular >80%, for $N_2O$. The process is thus superior to the prior art in terms of its performance, i.e. the achievable conversions of $N_2O$ and $NO_x$, and in respect of the operating and capital costs.

As a result of the virtually complete reduction of $NO_x$, a particularly high degree of removal of $N_2O$ is also achieved and a surprisingly low consumption of the reducing agent for $N_2O$ is achieved, which is an advantage of the invention.

The process of the invention can be employed, in particular, in nitric acid production, for offgases from power stations or for gas turbines. Process gases and offgases containing nitrogen oxides are obtained in these processes, and the nitrogen oxides can be removed inexpensively from these gases by means of the process described here.

In one embodiment of the process of the invention, a mixture of $CH_4$ and $NH_3$ is mixed into a gas comprising nitrogen oxides and the two are fed together into a reactor containing an iron-laden zeolite of the BEA type and subjected to nitrogen oxide removal there. The purified offgas is discharged into the atmosphere. In place of the prior mixing of methane and ammonia, the gases can also be introduced separately into the gas containing nitrogen oxides before entry into the reactor.

EXAMPLES

The experiments described below were carried out in a laboratory set-up and illustrate the invention.

The catalyst employed was an iron-laden zeolite catalyst of the BEA type which was used as granules having a particle size of 0.7-1.4 mm.

As apparatus for reducing the $N_2O$ content in the examples below, use was made of a tube reactor which was charged with such an amount of the above catalyst, based on the inflowing gas stream, that a space velocity of 10 000 h$^{-1}$ resulted. The temperature of the gas at the inlet of the reactor was set to 340° C. by heating. Analysis of the gas stream entering and leaving the apparatus was carried out by means of an FTIR gas analyzer.

The composition of the gas mixture to be treated was:
1500 ppm of $N_2O$; 600 ppm of $NO_x$, 2.5% by volume of $O_2$, 0.4% of $H_2O$ in $N_2$.

Before the gas stream entered the catalyst bed, ammonia and methane or propane were added.

Depending on the amounts of reducing agents added, the following residual concentrations of $N_2O$ and $NO_x$ were obtained at the reactor outlet:

| Example | Amount of $NH_3$ added | Amount of $CH_4$ added | Amount of $C_3H_8$ added | Residual $N_2O$ concentration | Residual $NO_x$ concentration |
|---|---|---|---|---|---|
| 1 | 700 ppm | 450 ppm | — | 897 ppm | 16 ppm |
| 2 | 800 ppm | 450 ppm | — | 25 ppm | 0 ppm |
| 3 | 500 ppm | — | 500 ppm | 425 ppm | 26 ppm |
| 4 | 600 ppm | — | 500 ppm | 129 ppm | 2 ppm |

As can be seen from the above table, a high degree of removal of $N_2O$ was achieved when the reduction of $NO_x$ by means of $NH_3$ addition is complete, as is the case in examples 2 and 4. Even low residual $NO_x$ concentrations, as shown in examples 1 and 3, inhibit the removal of $N_2O$.

The process of the invention thus achieves high degrees of removal of $N_2O$ and $NO_x$ at low temperature. The invention is thus substantially superior to the prior art as disclosed in JP-A-90/00,884. This document reports degrees of removal of $N_2O$ of only about 60-80% at a significantly higher temperature of 450° C.

The invention claimed is:

1. A process for reducing the content of $NO_x$ and $N_2O$ in $NO_x$- and $N_2O$-containing gases, comprising:
    a) adding at least one nitrogen-containing reducing agent to said $NO_x$- and $N_2O$-containing gas in at least the amount required for complete reduction of the $NO_x$,
    b) adding a hydrocarbon, carbon monoxide, hydrogen or a mixture of one or more of these gases to said $NO_x$- and $N_2O$-containing gas for the reduction of the $N_2O$,
    wherein the additions of a) and b) can be made in an order or added together to form a gas mixture, and
    c) introducing said gas mixture into at least one reaction zone at temperatures of up to 450° C. which contains one or more iron-laden zeolites.

2. The process as claimed in claim 1, characterized in that the nitrogen-containing reducing agent is ammonia.

3. The process as claimed in claim 1, characterized in that the reaction zone or zones contains an iron-laden zeolite which has channels made up of twelve-membered rings.

4. The process as claimed in claim 3, characterized in that all channels of the iron-laden zeolite are made up of twelve-membered rings.

5. The process as claimed in claim 4, characterized in that the iron-laden zeolite is of the BEA or FAU type.

6. The process as claimed in claim 1, characterized in that the nitrogen-containing reducing agent is ammonia and ethane, propane, butane, synthesis gas or LPG is used as reducing agent for $N_2O$.

7. The process as claimed in claim 6, characterized in that an iron-laden zeolite of the BEA type is used as iron-laden zeolite.

8. The process as claimed in claim 1, wherein said $NO_x$- and $N_2$-containing gases are process gases or offgases.

9. The process as claimed in claim 6, wherein said reducing agent for $N_2O$ is methane.

* * * * *